US010486897B2

(12) United States Patent
Schomaker et al.

(10) Patent No.: US 10,486,897 B2
(45) Date of Patent: Nov. 26, 2019

(54) TRANSPORT DEVICE FOR A MILLING UNIT, TRANSPORT VEHICLE WITH A TRANSPORT DEVICE FOR A MILLING UNIT, AND METHOD FOR TRANSPORTING A MILLING UNIT WITH A TRANSPORT DEVICE

(71) Applicant: BOMAG GmbH, Boppard (DE)

(72) Inventors: Rafael Schomaker, Lingen (DE); Joachim Ponstein, Gondershausen (DE); Maximilian Philippsen, Gingen an der Fils (DE); Thomas Thelen, Monreal (DE)

(73) Assignee: BOMAG GmbH, Boppard (DE)

( * ) Notice: Subject to any disclaimer, the term of this patent is extended or adjusted under 35 U.S.C. 154(b) by 283 days.

(21) Appl. No.: 15/383,276

(22) Filed: Dec. 19, 2016

(65) Prior Publication Data

US 2017/0174421 A1    Jun. 22, 2017

(30) Foreign Application Priority Data

Dec. 21, 2015    (DE) .......................... 10 2015 016 671

(51) Int. Cl.
| *B65D 88/12* | (2006.01) |
| *B65D 88/68* | (2006.01) |
| *B60P 1/54* | (2006.01) |
| *B60P 1/48* | (2006.01) |

(Continued)

(52) U.S. Cl.
CPC ................ *B65D 88/12* (2013.01); *B60P 1/54* (2013.01); *B65D 85/68* (2013.01); *B65D 88/129* (2013.01);

(Continued)

(58) Field of Classification Search
USPC .......... 29/428; 414/495, 809, 573, 799, 373, 414/341, 342, 349, 339, 338, 337, 340,
(Continued)

(56) References Cited

U.S. PATENT DOCUMENTS

| 1,619,941 A | * | 3/1927 | Kennedy | ................ | B62D 13/04 |
| | | | | | 280/426 |
| 1,928,475 A | * | 9/1933 | Batie | ....................... | B60T 11/04 |
| | | | | | 188/204 R |

(Continued)

FOREIGN PATENT DOCUMENTS

| AT | 223119 B | 8/1962 |
| CN | 2400315 Y | 10/2000 |

(Continued)

OTHER PUBLICATIONS

State Intellectual Property Office of the People's Republic of China, Notification of the First Office Action, Application No. 201611185801. 5, dated Sep. 7, 2018 (16 pages).

(Continued)

*Primary Examiner* — David P Bryant
*Assistant Examiner* — Lawrence Averick
(74) *Attorney, Agent, or Firm* — Wood Herron & Evans LLP

(57) ABSTRACT

The present invention relates to a transport device for a milling unit of a road milling machine, the milling unit comprising a milling drum box and a milling drum. Essential elements of the transport device include a support frame, a rotating device and a transport vehicle connector. The present invention further relates to a transport vehicle with a carrier vehicle and a transport device, as well as a method.

15 Claims, 5 Drawing Sheets

(51) Int. Cl.
  *B65D 85/68* (2006.01)
  *B65D 88/54* (2006.01)
  *B65D 90/12* (2006.01)
  *B65D 90/18* (2006.01)
  *E01C 23/088* (2006.01)

(52) U.S. Cl.
  CPC ............ *B65D 88/54* (2013.01); *B65D 90/12* (2013.01); *B65D 90/18* (2013.01); *B60P 1/483* (2013.01); *B65D 2585/6897* (2013.01); *E01C 23/088* (2013.01)

(58) Field of Classification Search
  USPC .......................................... 414/235; 172/240
  See application file for complete search history.

(56) References Cited

U.S. PATENT DOCUMENTS 3,757,972 A * 9/1973 Martin .................... B60P 3/062
      414/462
  3,874,537 A * 4/1975 Kou ...................... B60P 1/6463
      414/491

2004/0156703 A1    8/2004  Benedikt
  2012/0284989 A1   11/2012  Busley et al.

FOREIGN PATENT DOCUMENTS

CN        2818222    Y    9/2006
  CN      102747675    A   10/2012
  CN      202593349    U   12/2012
  DE        1166699    A    3/1964
  DE        2842173   A1    4/1980
  DE       29603750   U1    5/1996
  DE     102011018222 A1   10/2012
  DE     202011110042 U1    4/2013

OTHER PUBLICATIONS

State Intellectual Property Office of the People's Republic of China, Notification of the First Office Action, Application No. 201611190050.6, dated Mar. 20, 2019 (22 pages).

* cited by examiner

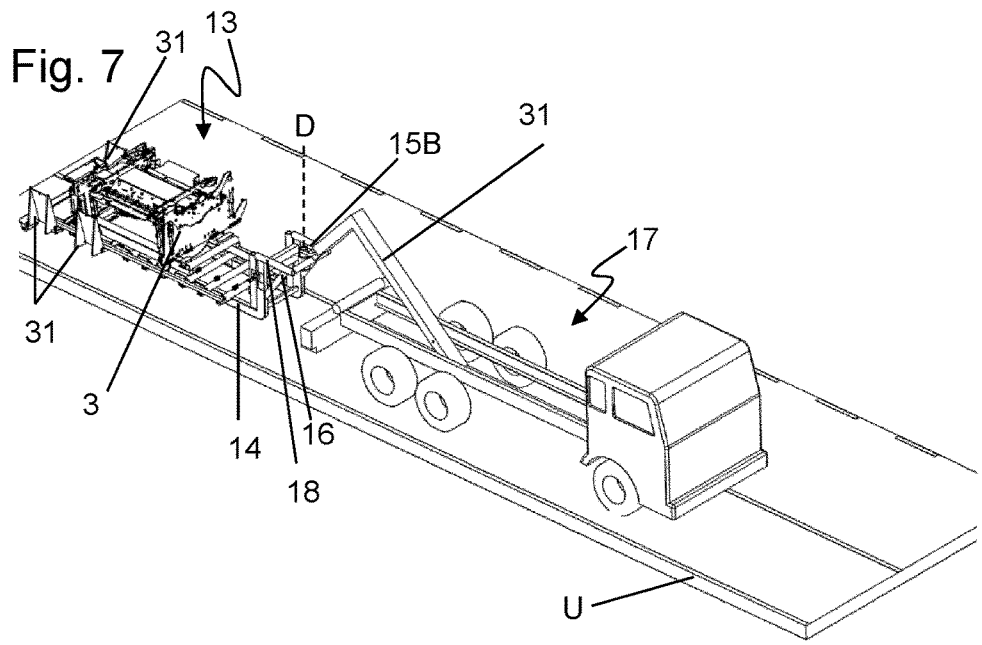
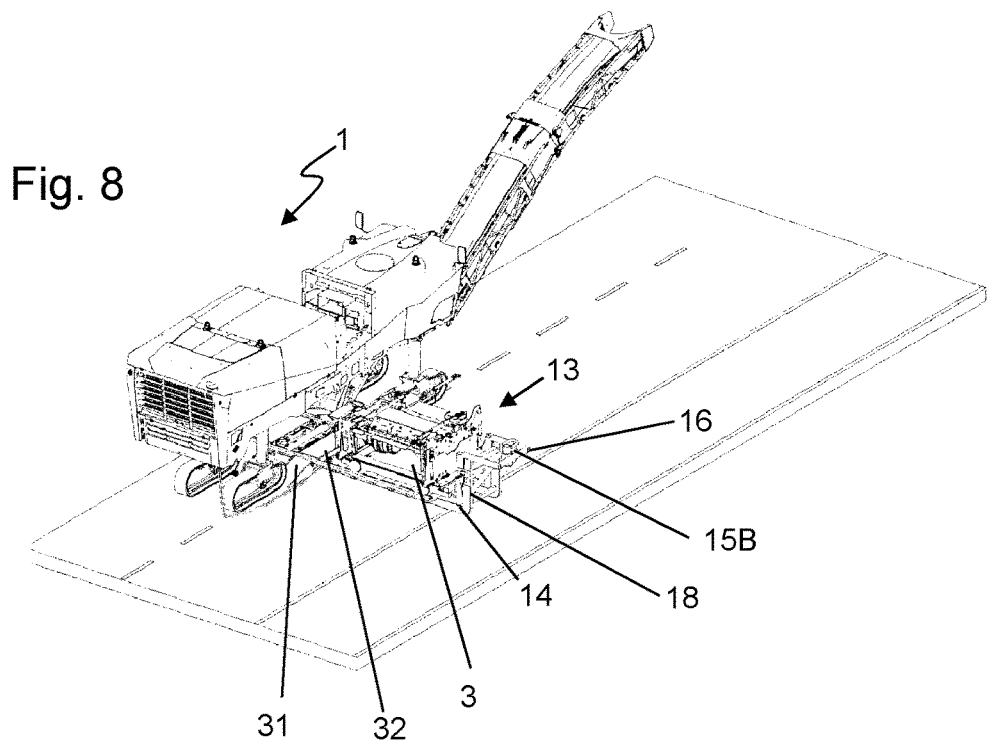

TRANSPORT DEVICE FOR A MILLING UNIT, TRANSPORT VEHICLE WITH A TRANSPORT DEVICE FOR A MILLING UNIT, AND METHOD FOR TRANSPORTING A MILLING UNIT WITH A TRANSPORT DEVICE

CROSS-REFERENCE TO RELATED APPLICATIONS

The present application claims priority under 35 U.S.C. § 119 of German Patent Application No. 10 2015 016 671.9, filed Dec. 21, 2015, the disclosure of which is hereby incorporated herein by reference in its entirety.

FIELD OF THE INVENTION

The present invention relates to a transport device for a milling unit, a transport vehicle, as well as a method for transporting a milling unit according to the independent claims.

BACKGROUND OF THE INVENTION

During operation of road milling machines, in particular of the large-scale milling machine type, there is often a need to replace the milling unit composed of milling drum box and milling drum, for example, in order to enable different working widths. Such road milling machines are often used in road construction for the controlled removal of the cover layer of asphalt roads. Essential elements of such a road milling machine are a machine part comprising a machine frame, an operator platform, a drive engine as well as travelling devices such as wheels and/or crawler tracks, which are driven by the drive engine. The travelling devices are usually connected to the machine frame via height-adjustable lifting columns, so that the distance of the machine frame to the ground is adjustable in the vertical direction by adjustment of the lifting columns. Furthermore, the road milling machine comprises, as the milling part, the milling unit comprising the milling drum for milling ground material and the milling drum box for covering the milling drum to the sides and to the top. Usually, the milling drum comprises a hollow-cylindrical support tube as well as a plurality of milling tools on the outer jacket surface of the support tube. The milling unit can be detachably fastened via a fastening device which retains the milling unit to the road milling machine. Such a road milling machine is known from DE 10 2011 018 222 A1, for example.

Often times, the machine per se and the milling unit (hereinafter, this includes variants with and without a milling drum arranged inside the milling unit) are transported separately in order to not have to use heavy duty vehicles due to the existing legal restrictions with respect to maximum transport dimensions and maximum transport weight. It will be appreciated that working times as short as possible are desired for dismounting and mounting the milling unit from/to the machine part. Moreover, there is often a need to be able to mill different milling widths with one and the same road milling machine. In this regard, it is preferred when different milling units can be mounted in an alternating manner and rapidly replaced on one and the same road milling machine. Often times, the milling unit is detachably connected to the machine part via massive fastening screws and corresponding locking nuts or also via other types of detachable fastening devices.

The most time-consuming step of the dismounting and mounting process often consists in the positioning of the milling unit relative to the road milling machine. Related special-purpose vehicles which are self-propelled, self-steered and height-adjustable, for example, often need to be transported separately and are very expensive. Moreover, there is only limited space available, in particular in road construction sites, so that space-consuming maneuvering is not possible.

SUMMARY OF THE INVENTION

It is therefore an object of the present invention to provide a possibility to improve the transport of the milling unit, in particular to and away from the road milling machine.

In a first aspect, the present invention relates to a transport device for a milling unit, in particular a milling unit of a road milling machine. The elements of the transport device are a support frame, a rotating device as well as a transport vehicle receptacle. The support frame forms the basic structure of the transport device. This may be an essentially rectangular basic structure which is comparatively flat when viewed in the vertical direction. The support frame may consist of struts, but, additionally or alternatively, may also be a continuous surface, which may also protrude beyond the edges of the support structure formed by struts. The support frame forms the bottom structure of the transport device. Thus, the support frame provides a support structure on which the milling unit can be placed or positioned. The support frame preferably has a longitudinal design with respect to its surface area, in particular an essentially rectangular shape. In the case that the transport device is loaded onto a carrier vehicle, the longitudinal axis of the transport device preferably extends in the travelling direction of the carrier vehicle. Specifically, in terms of its outside dimensions, the transport device is in the range of conventional loading troughs.

Furthermore, according to the present invention, the transport device comprises a rotating device. With respect to its function, the rotating device is configured such that it enables rotation of the milling unit relative to the ground about a rotation axis, in particular an essentially vertical rotation axis. Thus, by means of the rotating device, it is possible to maneuver or bring the milling unit into a favorable pre-position relative to the road milling machine, in order to bring the milling unit into a more precise mounting position relative to the road milling machine more easily starting from said pre-position. The object achieved by the rotating device according to the present invention thus is that rough maneuvering work between the transport device and the road milling machine is significantly facilitated and, furthermore, can usually be effected on a comparatively narrow space. Thus, the rotating device is configured such that a change of the relative position of the milling unit in relation to the ground is possible by means of the rotating device. Thus, the present invention includes both transport devices in which the rotating device enables rotation of the milling unit relative to the transport device, as well as transport devices which enable rotation of the transport device itself, in particular driven by a carrier vehicle. In the latter case, rotation of the milling unit is thus effected together with the transport device. It is also important that the rotating movement need not necessarily be effected about a virtual rotation axis which extends through the milling unit in the vertical direction. The essential factor is that in particular the pre-positioning of the milling unit relative to the milling machine is improved.

The transport device according to an exemplary embodiment of the present invention also includes a transport vehicle connector for coupling to a carrier vehicle. In other words, the transport device according to the present invention is configured to be coupled to a carrier vehicle and to be loaded and unloaded by said vehicle. Thus, the coupling connection is, in particular, configured to be detachable, and a plurality of different coupling systems may be considered. In the simplest and preferred case, the coupling device of the transport device is configured such that it can be coupled to the hook of a loading arm of a swap body truck, for example, via a hook eyelet or the like. Such systems are also referred to as hook unwinding systems. Such swap body trucks are trucks that are often used as carrier vehicles for swap body vehicle troughs/containers. They comprise a vehicle frame, a driver's cab, as well as a loading arm, by means of which transport units standing on the ground can be loaded or unloaded to the rear side, usually coming from behind in relation to the forward direction of the truck. To this end, the transport unit is usually pulled up onto the vehicle frame by means of the load arm. Such a swap body truck is known from DE 296 03 750 U1.

The rotating device according to the present invention allows to more easily effect alignment of the milling unit relative to either the carrier vehicle and/or the road milling machine. The rotating device is preferably configured such that it allows rotation of the milling unit about an essentially vertical axis. Thus, for the mounting and dismounting process of the milling unit, this will make it possible to achieve an optimal relative position of the milling unit in relation to the road milling machine and/or the transport device and/or the carrier vehicle even under restricted maneuvering conditions.

In order to ensure a defined position of the milling unit on the transport device, the transport device preferably further includes a milling unit receptacle device. This is a device on the support frame which is configured for receiving and retaining the milling unit to the support frame, for example, to enable a defined positioning and/or to protect the tips of the milling tools protruding downward. The milling unit receptacle device is particularly configured such that the milling unit, coming from above, can be placed thereon. In the simplest case, the milling unit receptacle device are holding elements such as wedges, metal sheets, troughs, walls or the like, which enable a defined positioning of the milling unit. As will be explained in greater detail below, the milling unit receptacle device can be a skid or the like, for example. In other words, the milling unit receptacle device may be configured to be stationary in relation to the support frame, or, preferably, movable, in particular rotatable and/or displaceable. The milling unit receptacle device is configured such that the placed-on milling unit is supported on parts of the milling drum box and not on parts of the milling drum.

The rotating device preferably comprises a rotary joint which is at least partially arranged on the support frame and via which the milling unit on the support frame can be rotated relative to the support frame. In this embodiment of the present invention, the milling unit receptacle device can thus be rotated on the transport device relative to the support frame. For example, this is of advantage when the transport device stands parallel next to the road milling machine. Usually, the milling unit is arranged and transported parallel to the longitudinal extension of the transport device with its longitudinal extension, which typically lies in the direction of the rotation axis of the milling drum arranged inside the milling drum box. This is determined already by the width the milling unit normally has. However, this means that the milling unit is to be rotated by 90° in the case that the transport device is positioned parallel to the road milling machine, in order to get into its rough alignment position. In the present embodiment, said position change of the milling unit can be achieved by rotating the milling unit relative to the support frame via the rotary joint. Thus, in this embodiment of the present invention, not the entire transport device is rotated, but merely a part including at least the milling unit is rotated. This also includes embodiments in which the milling unit rests on a milling unit receptacle device, which is yet to be described below, on the support frame. In such cases, it may be advantageous to connect the milling unit receptacle device to the support frame via the rotary joint.

Specifically, the rotating device may be a rotary plate having a rotation axis which extends essentially centrally in relation to the distance from the longitudinal sides of the transport device. The longitudinal sides of the transport device are the two sides having the greatest longitudinal extension in a horizontal plane. In this case, a rotary plate generally relates to a device which has an upper receptacle side, on which the milling unit can be supported. The at least one rotary joint is arranged, for example, with a drum bearing or the like, on the bottom side and/or on the sides of this device. A rotary plate is advantageous since it allows stable support of the milling unit. Furthermore, the supporting forces may be distributed in a better way so that the stress of the rotating device and thus its wear can be reduced, for example.

Ideally, support rails and rolls are arranged between the support frame and the rotary plate in order to facilitate the rotational movement of the rotary plate. The support rails then advantageously extend coaxially to the rotation axis.

According to one embodiment of the present invention, however, the configuration of the rotating device is not limited to variants in which the milling drum box is pivotable in relation to the support frame. The present invention also comprises variants which allow rotatability of the entire transport device in relation to the ground by means of the rotating device. This may include a rotating foot which can be extended toward the ground, for example. This foot stands on the ground in the extended state and lifts the transport device, or at least relieves the ground from the further elements of the transport device, which can then be rotated about the rotating foot. However, it is preferred when the transport vehicle connector comprises a loading arm connection via which the transport device can be coupled to a loading arm of the transport vehicle, in which case the rotating device preferably comprises a rotary joint via which the loading arm connection is rotatable in relation to the support frame of the transport device. Thus, in some respect, in this exemplary embodiment, the transport device is "steerable" and can be moved around a corner, in particular via a pull or push movement of the carrier vehicle, respectively. The milling unit is also rotated in relation to the ground. In order to facilitate this movement of the transport device, it is preferred when the transport device comprises at least one and, in particular, at least two ground rolls on its end opposite the transport vehicle connector. This may significantly reduce the rolling resistance of the transport device on the ground and facilitate cornering of the transport device. This embodiment also provides the advantage that the transport device can be slightly lifted from the carrier vehicle when being coupled to the carrier vehicle, and stands on the ground then only via the ground rolls.

Specifically, the rotating device can be a rotary sleeve with a hook eyelet which protrudes particularly in the radial direction relative to the rotation axis. The rotary sleeve is supported to be rotatable, in particular about a vertical rotation axis, on the transport vehicle connector, which may, for example, be a loading arm projecting upward from the receiving surface of the transport device for the milling unit in the vertical direction. Thus, if the carrier vehicle engages the hook eyelet with its loading arm, it may thereby lift the transport device on one side and slide the transport device on the ground and also steer it. The present invention naturally also includes other connection options, for example, suitable latch connections, etc. The essential factor lies with the support of the loading arm connection of the transport device being rotatable in relation to the remaining transport device.

The two previously described variants of the rotating device can naturally also be combined with one another in one and the same transport device. This is also preferred since a particularly wide movement spectrum is enabled.

Preferably, besides the rotating device, further devices via which a relative movement of the milling unit in relation to the support frame is possible are also comprised by the transport device according to an exemplary embodiment of the present invention. This particularly relates to at least one guide rail or rail system, respectively, via which a displacement of the milling unit is possible relative to the support frame. In the following embodiments concerning the specific configuration of the guide rail, both types of variants, i.e., variants in which the guide rail is directly arranged on the milling unit and corresponding rolling devices are, for example, arranged on the transport device, and, preferably, also variants in which the guide rail is fixed to the support frame and the milling unit is moved along the at least one guide rail via corresponding rolls. It is particularly preferable when the guide rail is designed to have at least two rails in order to allow a particularly stable guidance of the milling unit. In the simplest case, the guide rails are longitudinal thresholds or swells along which the milling unit is displaceable.

In order to enable a reliable guidance of the milling unit beyond the outside dimensions of the transport device in this case as well, in particular in relation to the outside dimensions of the support frame, it is preferred according to the present invention that the transport device comprises a rail extension, via which the track of the guide rail can be extended, in particular beyond the outer circumference of the support frame. In this respect, various specific construction-related configurations can be considered as well. In one embodiment of the present invention, for example, the rail extension may be movable, in particular pivotable and/or displaceable, on the transport frame between a transport position and a displacement position. For transport purposes, the rail extension can be adjusted into a space-saving storage position, ideally on the transport device itself. If, in contrast, the milling unit is to be loaded or unloaded, the rail system allows achieving a guide connection to a position, in particular below the road milling machine, in order to bridge the path between the transport device and the approximate mounting position directly below the road milling machine. Additionally, or alternatively, the rail extension may be configured to be mountable on, and dismountable from, the transport frame, in particular by means of plug mounting, screw mounting and/or latch mounting. In this embodiment according to the present invention, the rail extension may thus not be supported on the support frame of the transport device via a corresponding slide and/or pivot bearing, but may be configured to be easily mountable and dismountable via suitable mountings. The advantage of this embodiment lies with the fact that the configuration of the rail extension can be modified in a comparatively wide range. Here, it is possible to transport the dismounted rail extension together with the remaining transport device or separately.

In order to make the displacement process even more comfortable, the transport device may further comprise a drive device with which the adjustment of the guide rail between a transport position and a displacement position can be driven by a motor. This may be advantageous in particular in view of the relatively high weights of the milling units. In this regard, it is possible to configure this drive device to be driven by the carrier vehicle or to dispose a distinct drive source on the transport device, then preferably a battery. An energy supply via the energy system of the road milling machine via corresponding connection lines is also possible and included within the scope of the present invention.

In order to ensure a safe position stability of the milling unit on the transport device, the transport device preferably includes a milling unit receptacle device, which is at least partially supported on the support frame. The milling unit receptacle device thus is a construction-related measure via which the positioning of the milling unit on the transport device is defined.

Preferably, the milling unit receptacle device comprises a transport skid, in particular a transport skid adjustable along the guide rail and/or the rail extension, which is configured for receiving the milling unit and which is adjustable relative to the support frame. Thus, the transport skid is a movable intermediary unit, the object of which on the one hand lies with receiving the milling unit and on the other hand with facilitating the movement of the milling unit relative to the remaining transport device. To that end, the transport skid may comprise suitable rolls, in particular guide rolls. Furthermore, the transport skid itself may also be rotatable relative to the support frame and/or comprise a drive device for moving the transport skid by means of a motor.

The transport device, in particular the support frame and the transport vehicle connector, is preferably designed in the type of a dumper trough. A dumper trough is characterized in that it can be loaded or unloaded by a swap body truck, typically by means of a hydraulically actuatable loading arm. This configuration of the transport device according to one embodiment of the present invention provides the advantage that for the transport of the transport device, conventionally known and available carrier vehicles and corresponding mechanisms for loading and unloading can be used. An expensive special-purpose vehicle can be dispensed with.

It is preferred when the scope of rotation, i.e., the maximum rotation angle range, of the rotating device is at least 90°, in particular at least 180° and very particularly 360°. If the rotation angle is at least 90°, a complete rotation from a longitudinal orientation to a transverse orientation is possible to one of the two sides starting from an initial position. Accordingly, such a rotation can be enabled to both sides when the rotation angle range is at least 180°.

A further aspect of the present invention lies with a transport vehicle comprising a carrier vehicle and a transport device for a milling unit, in particular a transport device as described above. Thus, the transport vehicle constitutes the entirety of, preferably self-propelled, carrier vehicle and loadable and unloadable transport device. According to one embodiment of the present invention, the carrier vehicle preferably comprises a, particularly hydraulically adjustable, loading arm, which can be detachably connected to the transport device. The transport device can be loaded to and unloaded from the carrier vehicle by means of this loading arm. Thus, the carrier vehicle itself provides the required tools in order to take up and/or unload the transport device resting on the ground, so that, in particular, an additional loading vehicle can be dispensed with. According to the present invention, the transport device has a rotating device, which is configured such that the transport device is rotatable relative to the carrier vehicle about an essentially vertical rotation axis. In this regard, reference is made to specific details of the transport device according to the present invention as described above. However, the important factor is that according to the present invention the rotational movement may be controlled via movement of the carrier vehicle. In particular, if the loading arm is connected to the transport device via a rotary joint, the transport device can be maneuvered on the ground at least to a limited extent, comparable to a trailer. The load arm in this case acts in the manner of a trailer coupling. This is advantageous in that the drive motion of the carrier vehicle can be used for maneuvering the transport device and thus for maneuvering the milling unit arranged on the transport device at the same time. No distinct propulsion of the transport device is then required for a movement of the transport device. As a result, the transport device according to the present invention can be produced in a comparably cost-efficient manner.

In terms of the overall structure, the carrier vehicle is preferably designed as a so-called swap body vehicle, in particular a self-propelled swap body vehicle with a hydraulically adjustable loading arm. Swap body vehicles are trucks which are designed as carrier vehicles for the transport of special containers and which can autonomously, i.e., without additional vehicles, load and unload these containers in a short time using, for example, a hydraulic loading arm. This significantly facilitates the logistic efforts for the transport of the transport device, since, in particular, the loading and unloading of the transport device can be effected in a quick manner.

Finally, a further aspect of the present invention lies with a method for transporting a milling unit, in particular by means of a transport vehicle according to an exemplary embodiment of the present invention. Essential steps of the method according to the present invention include: loading, the milling unit onto a transport device, rotating the milling unit about an essentially vertical rotation axis of of for positioning the transport device relative to a carrier vehicle, in particular a carrier vehicle according to the present invention, and loading the transport device onto the carrier vehicle together with the milling unit. This process thus relates to the loading of the transport device as effected, for example, after dismounting the milling unit from the road milling machine.

The method according to one embodiment of the present invention also includes the reverse process, i.e., delivering the milling unit with the transport vehicle and subsequent mounting. According to one embodiment of the present invention, after delivering the milling unit with the transport vehicle, first unloading of the transport device from the carrier vehicle is effected. In order to achieve a favorable starting position for the mounting process, a rotation of the milling unit is then effected about an essentially vertical rotation axis in order to adjust the milling unit to a preposition relative to the road milling machine which is favorable for the further mounting process. Finally, fixing of the milling unit to the road milling machine is effected, which may involve further steps for rough and/or fine adjustment of the relative position of the milling unit relative to the road milling machine. However, a factor for the two presently named method phases is that the milling unit is rotated about an essentially vertical rotation axis. This can be effected by rotation of the milling unit on the transport device or relative to the transport device and/or by rotating the transport device together with the milling unit relative to the ground. With respect to construction-related details, reference is made to the above description.

In order to further simplify the movement of the milling unit relative to the transport device and for a larger spectrum, the method according to the present invention may further comprise displacement of the milling unit on the transport device, in particular by using a rail system. Displacement means, in particular, a linear movement of the milling unit along a guide rail and, in particular, of a pair of rail swells. Thus, by means of the rail system, a movement infrastructure is used on the transport device which enables easy movement of the milling unit, in particular without the help of heavy equipment. The mounting and/or dismounting process, or delivering and transporting the milling unit away, respectively, can thereby be significantly simplified.

BRIEF DESCRIPTION OF THE DRAWINGS

The present invention will be explained in more detail with reference to the exemplary embodiments illustrated in the figures. In the schematic figures:

FIG. 7 shows a transport vehicle with a carrier vehicle and a transport device according to a second embodiment;

FIG. 8 shows the transport device of FIG. 7 in a rotated position;

Like components are indicated by like reference numerals throughout the drawings, wherein not each of the components is necessarily repeatedly indicated in each figure.

DETAILED DESCRIPTION OF THE INVENTION

Figure 1:
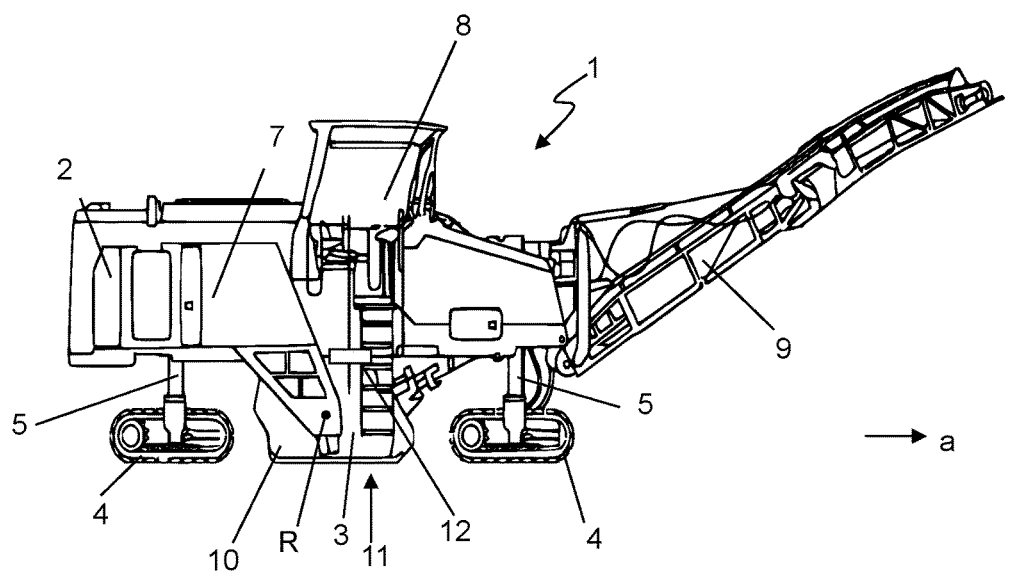
FIG. 1 is a side view of a road milling machine.

FIG. 1 shows a road milling machine 1, in the present case a cold road milling machine of the large-scale, central rotor milling machine type. Essential elements of the road milling machine 1 are a machine part 2 and a milling unit 3. The machine part 2 comprises a machine frame 6 which is supported by travelling devices 4 via lifting columns 5 and comprises a drive engine 7, an operator platform 8 and a milled material conveyor device 9. The lifting columns 5 allow height adjustment of the machine frame 6 in the vertical direction relative to the ground. The drive engine 7 supplies the drive energy required for the propulsion of the machine and the drive of the milling device, which will be described in more detail below. From the operator platform 8, operation of the road milling machine 1 is effected during working operation by an operator. During working operation, the road milling machine 1 travels over the ground to be processed in the working direction a and mills ground material. Specifically, this is effected by means of the milling unit 3, comprising a milling drum box 10 as well as a milling drum 11 arranged inside the milling drum box 10. The milling drum box 10 comprises a front wall, a back wall, a cover located above the milling drum 11, as well as covers to the right and left sides. Toward the ground, the milling drum box 10 is designed to be open so that the milling drum 11 positioned inside the milling drum box 10 can engage the ground. During milling operation, the milling drum 11 rotates about a horizontal rotation axis extending transversely to the working direction a.

The milling unit 3 is configured to be demountable as a modular unit relative to the machine part 2 of the road milling machine 1, for example, for transport or exchange purposes. To that end, a fastening device 12, which is merely schematically indicated in FIG. 1, for connecting the milling unit 3 to the machine part 2 is provided. It will be readily understood that for mounting/dismounting the milling unit 3, the power train, which is partially configured as a belt transmission in the present embodiment, has to be disconnected and re-established after installation of the milling unit 3. As an alternative, a drive connection to a hydraulic system is possible here as well. Basically, suitable quick-coupling systems may be considered for establishing energy and/or drive connections between the milling unit 3 and the road milling machine 1.

In order to enable a most simple transport of the road milling machine 1, the milling unit 3 can be transported separately from the road milling machine. To that end, a transport device 13 is provided. This device is further illustrated in FIG. 2. The essential elements of the transport device 13 include a support frame 14, rotating devices 15A/15B and a transport vehicle connector 16 for coupling to a carrier vehicle 17. The support frame 14 is a frame-like overall structure and may optionally comprise a receiving surface as a bottom or be formed as a bottom per se. The basic shape of the support frame 14 is usually essentially rectangular, its longitudinal extension extending in the transport direction, i.e., the direction in which the transport device 13 is transported in the loaded state. The milling unit 13 can be placed on the support frame 14. The support frame 14 further has an essentially flat shape, so that it has a comparatively small vertical extension, except for the area of the transport vehicle connector 16. This particularly facilitates positioning of the milling unit 3 underneath the road milling machine 1. Starting from the situation shown in FIG. 2, the transport device 13 may either be slid in the direction of the arrow B under the road milling machine 1 as a whole, or at least the milling unit 3 may be slid from the transport device in the direction of the arrow B, as will be explained in more detail below.

Figure 2:
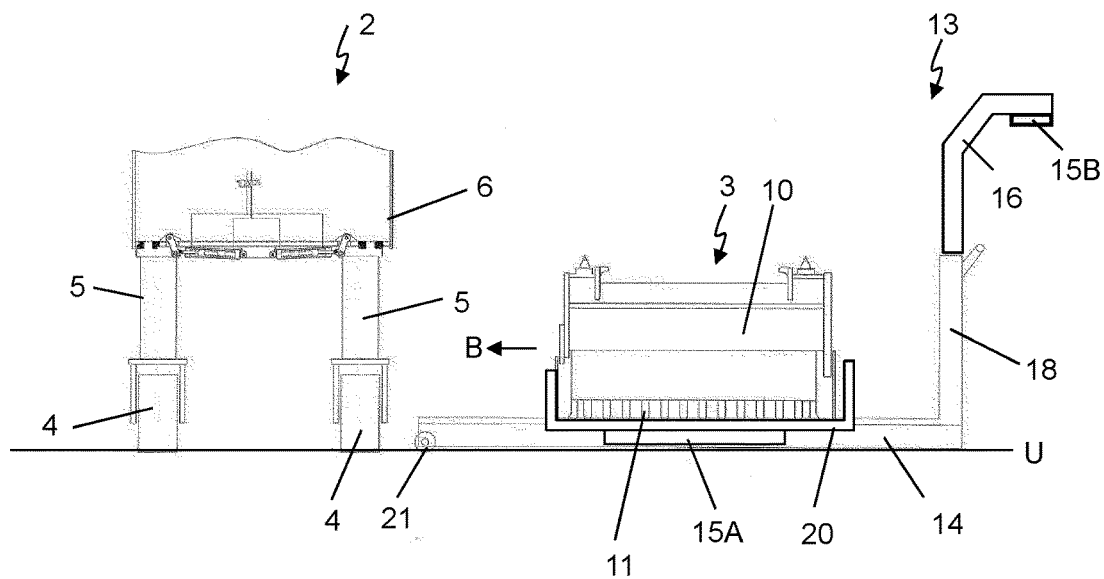
FIG. 2 is a view of a road milling machine and a transport device with a milling unit.

Furthermore, a first rotating device 15A and a second rotating device 15B are schematically indicated in FIG. 2. The first rotating device 15A is arranged underneath the milling unit 3 and allows rotating the milling unit 3 on the support frame 14 about a vertical rotation axis D. This may be a rotary plate, for example, as will be explained in more detail below.

The second rotating device 15B is arranged in the area of the transport vehicle connector 16 and allows that the milling unit 3 can be rotated together with the remaining transport device 13, comparable to a steering movement. Said rotating device 15B, in particular, cooperates with the carrier vehicle 17, which will be explained in more detail below. The function and effect of the two rotating devices 15A and 15B will be described below by means of two exemplary embodiments, and it is included in an exemplary embodiment of the present invention that both rotating devices 15A and 15B are simultaneously implemented on one transport device 13.

The transport device 13 is further configured in the manner of a dumper trough. For loading on and unloading from a carrier vehicle 17, which preferably is a so-called swap body vehicle, the transport device 13 comprises a loading arm 18 projecting in a vertical direction from a support frame 14 oriented essentially in a horizontal plane, on the end of which arm is arranged a loading arm connection, specifically a hook eyelet 19. The carrier vehicle 17 with its loading arm 31 can couple into said eyelet, as will be explained below.

The transport device 13 further comprises a milling drum box receptacle 20. This is a device into which the milling unit 3 can be lowered, in particular from above, and which stabilizes positioning of the milling unit 3 on the transport device 13. Specifically, this may be a receiving frame, for example, the support points of which are adjusted to the milling unit 3.

The transport device 13 may further comprise ground rolls 21, which are arranged, in particular, on the face side of the support frame 14 opposite the transport vehicle connector 16 of the transport device 13. Via said ground rolls 21, it is possible to roll the transport device 13 in a state slightly lifted off the ground by the transport vehicle connector 16 without damaging the ground.

Figure 3:
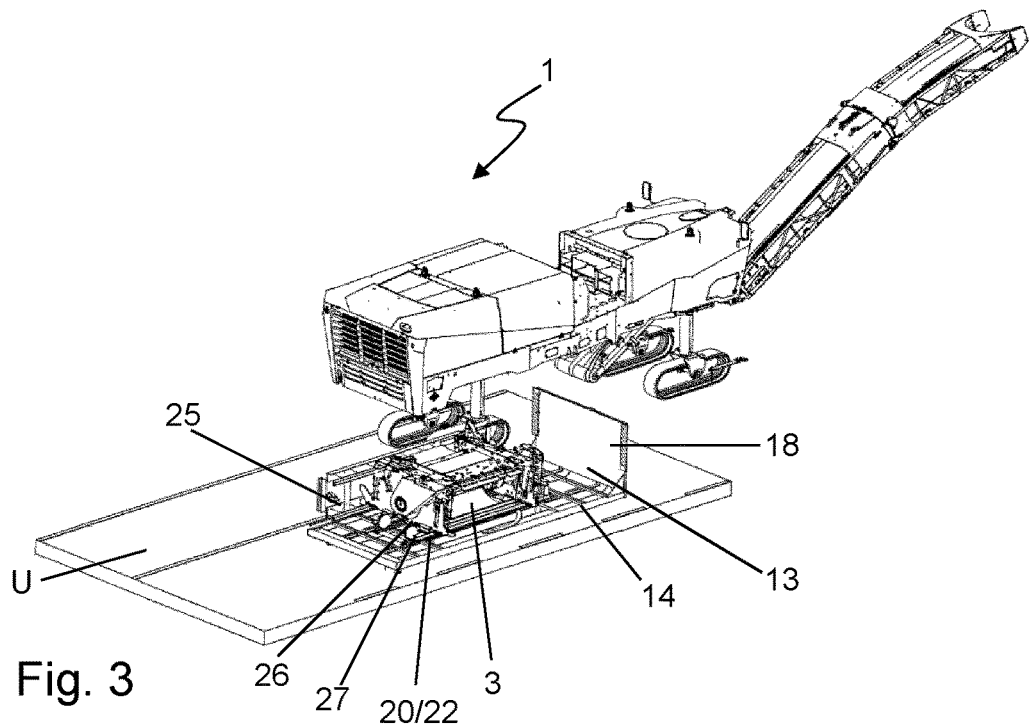
FIG. 3 is a perspective oblique view of a transport device according to a first embodiment with a transport device parked next to a road milling machine.
Figure 4:
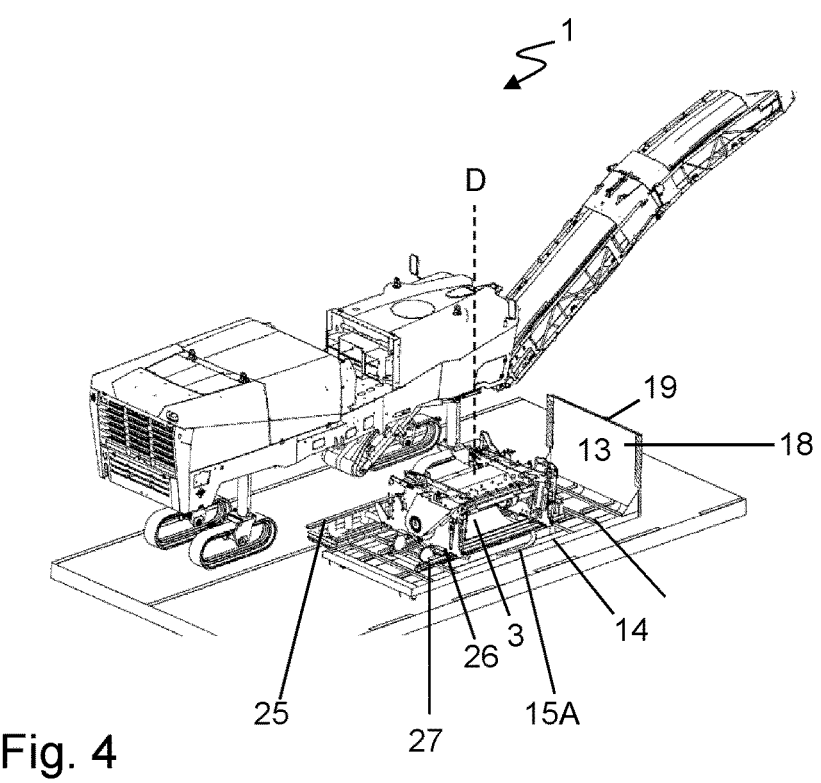
FIG. 4 shows the transport device of FIG. 3 with pivoted guide rail.

The exemplary embodiment of the transport device 13 according to FIGS. 3 to 6 illustrates functioning of the first rotating device 15A. Here, FIG. 3 represents the state in which the milling unit 3 is provided for mounting on the road milling machine 1 from the transport device 13, which has already been placed on the ground U. As can be seen in FIG. 3, the transport device 13 is arranged parallel (with respect to its longitudinal extension) next to the road milling machine. Now, the road milling machine is moved in a first step in a rough vicinity next to the transport device 13, or parallel (with respect to the longitudinal extension) thereto. The corresponding final position is indicated in FIG. 4. FIG. 3 further illustrates that the milling unit 3 is also positioned parallel to the road milling machine 1 in a longitudinal direction on the transport device 13. With respect to its final orientation for working operation, the milling unit 3 is turned by 90° accordingly. In order to bring the milling unit 3 into the desired position, the milling unit 3 is in a first step on the support frame 14 by 90° about a vertical rotation axis D. To that end, the milling unit 3 is specifically arranged on a rotary plate 22, which at the same time forms the milling drum box receptacle 20. The rotary movement can be driven by means of a motor, but it is effected manually in the present exemplary embodiment. The corresponding rotation of the milling unit 3 on the support frame 14 can be taken from a synopsis of FIGS. 4 and 5. Thus, while the milling unit 3 has been delivered in an orientation transverse to the road milling machine 1, the milling unit 3 can be turned into the desired pre-position corresponding to its final mounting position in a particularly space-saving manner, without there being a need to maneuver the entire transport device 13 to that end.

Figure 5:
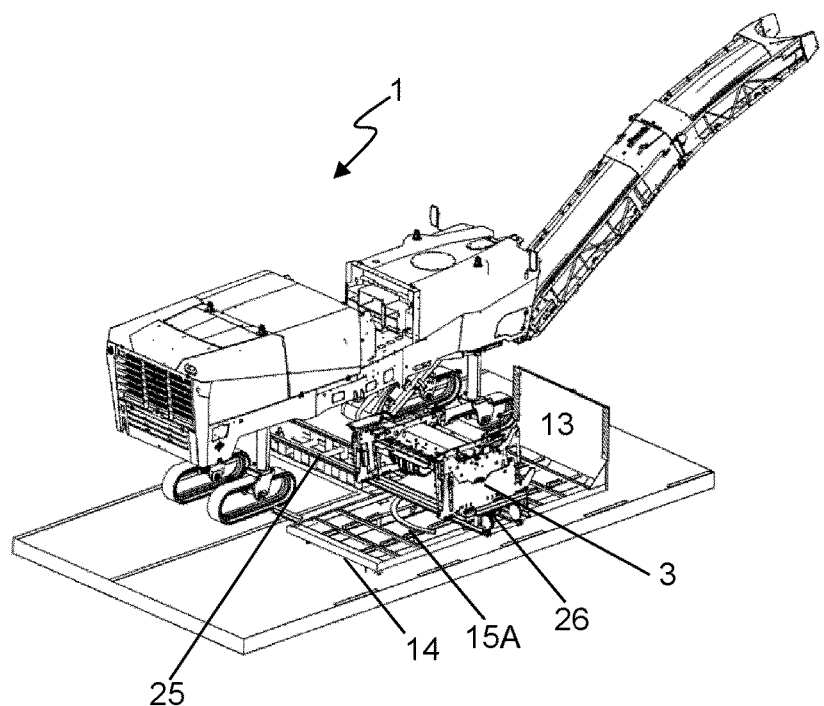
FIG. 5 shows the transport device of FIG. 4 with extended guide rail and rotated milling unit.

Another element of the transport device 13 further according to one embodiment is a rail system 23, comprising support frame rails 24 arranged on the support frame as well as a rail extension 25 arranged at the peripheral region of the support frame 14. On the rail system 23, the milling unit 3 can be moved via a transport skid 26, which is part of the milling drum box receptacle device 20, on the support frame 14 on the one hand, but on the other hand also be slid away from the support frame 14, for example, below the road milling machine 1, as illustrated in the Figures. To that end, prior to or simultaneously with the above-described rotation of the milling unit 3, the rail extension 25 is initially pivoted downward laterally to the support frame 14 (FIG. 4) from a transport position pivoted upwardly according to FIG. 3 and is subsequently placed underneath the road milling machine 1 as a rail extension (FIG. 5). On the whole, this achieves a rail guidance from the support frame 14 to underneath the road milling machine 1, via which the milling unit 13 can be displaced from the support frame 14 to underneath the road milling machine 1 for further mounting. The advantage of this solution particularly lies with the fact that the elements required for moving the milling unit 3 are provided by the transport device 13 itself, so that additional tools, such as a forklift, can be dispensed with in particular on-site.

In order to enable an easy movability of the skid 26, said skid comprises skid rolls 27, which are arranged on the skid 26 and which can roll on the rail system 23.

Figure 6:
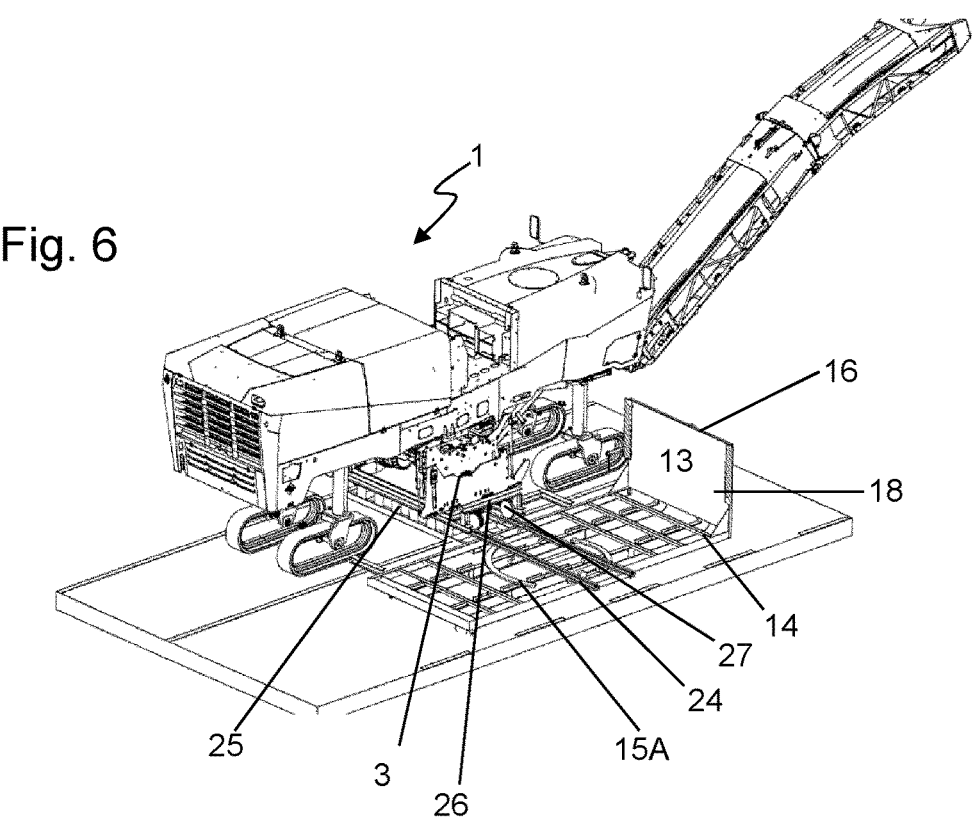
FIG. 6 shows the transport device of FIG. 5 with the milling unit slid from the transport device to underneath the road milling machine.

Starting from the situation illustrated in FIG. 6, in the next step, the milling unit 3 is fastened to the machine frame of the road milling machine 1. When the road milling machine 1 is then lifted via its lifting columns, the milling unit 3 lifts-off from the skid 26. It is then possible to pull out the rail extension 25 from below the road milling machine 1 and to store it on the transport device 13 again. The road milling machine 1 is operational then.

The dismounting and loading process of the milling unit 3 is effected in the reverse order accordingly, and it is again merely required here that the road milling machine 1 moves next to the transport device 13, so that extensive maneuvering works can be omitted in this case as well.

FIGS. 7 to 10 show a second variant of the transport device 13, wherein the rotating device 15B is integrated in the transport vehicle connector 16 here. Details on this can be taken from FIG. 7, which illustrates the transport device 13 in the unloaded state together with the carrier vehicle 17. Here, the transport device 13 has been unloaded from the carrier vehicle 17 toward the rear side, so that the transport device 13 and the carrier vehicle 17 are arranged in alignment with each other with respect to their longitudinal extension. If now the milling unit 3 is mounted to a road milling machine 1, the transport device 13 enables that it is turned by the carrier vehicle 17 using the rotating device 15B, comparable to a trailer. The final position thus reached is indicated in FIG. 8.

Figure 10:
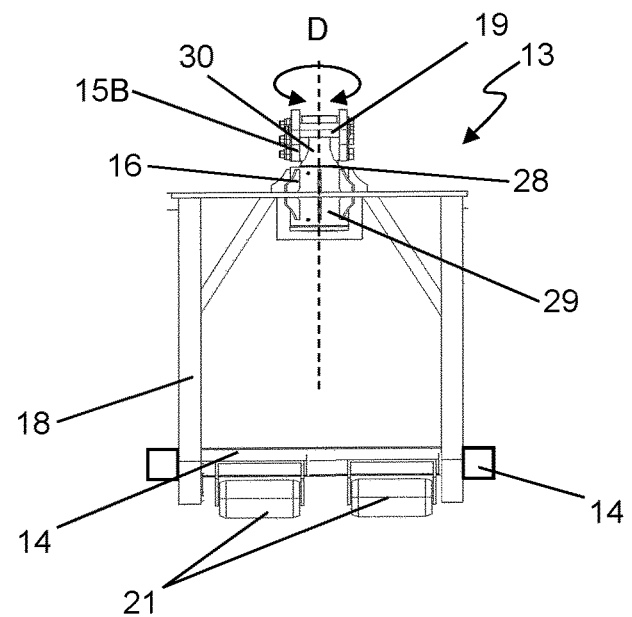
FIG. 10 is a face-sided plan view of the transport device of FIG. 9.

Details on the configuration of the rotating device 15B can particularly be taken from FIG. 10. The transport device 13 comprises a rotary joint 28 with a vertical rotation axis on its loading arm 18. Part of the rotary joint is formed by a joint bearing 29 on the transport device 13. A rotary sleeve 30 which is rotatable about a vertical rotation axis D is articulated on the joint bearing 29, which rotary sleeve comprises a hook eyelet 29 for the loading arm 31 of the carrier vehicle 17 which protrudes in the radial direction from the essentially cylindrically shaped rotary sleeve 30. To that end, the loading arm 31 of the carrier vehicle 17 is formed as a receiving hook or the like, for example. If now the transport device 13 is slightly lifted via the loading arm 18 and the loading arm 31 of the carrier vehicle 17, it only rests on the ground with its face-sided end opposite the transport vehicle connector 16, which usually has the above-described ground rolls 21. It is easily possible then to change the position of the transport device 13 comparable to a trailer via corresponding maneuvering and steering movements of the carrier vehicle 17, and to thereby rotate the milling unit 13 relative to the ground. The carrier vehicle 17 then rotates about axis D relative to the transport device 13.

The transport device 13 according to the exemplary embodiment of FIGS. 7 to 10 further comprises pivotable ramps 21 as well as drive-over webs 32, which bridge the path between two ramps 31 over the transport device 13. This way, the transport device 13 can be partially driven-over by the road milling machine 1, whereby a comparatively precise pre-positioning of the milling unit 3 relative to the road milling machine 1 can be achieved.

Figure 9:
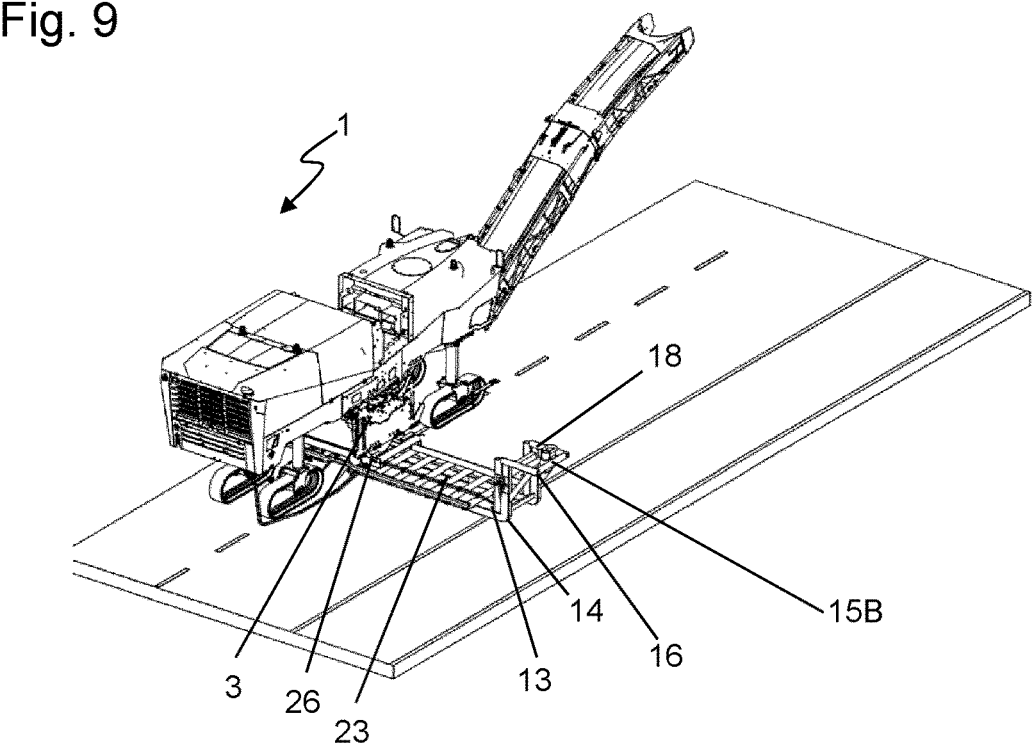
FIG. 9 shows the transport device of FIG. 8 with the milling unit slid from the transport device to underneath the road milling machine.

In this exemplary embodiment as well, the milling unit 3 is placed on a skid 26, which can be slid longitudinally on the support frame 14 via a corresponding rail system 23. This option is used when the milling unit 3 is pushed underneath the road milling machine 1, as illustrated in FIGS. 8 and 9, for example.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A transport vehicle with a carrier vehicle and a transport device for a milling unit of a road milling machine, wherein,
   the transport device comprises:
   a support frame;
   a rotating device configured to rotate the milling unit relative to the ground about a rotation axis (D) which extends essentially vertically; and
   a transport vehicle connector for coupling to the carrier vehicle,
   wherein the carrier vehicle comprises a loading arm which is detachably connected to the transport device, and that the transport device is loaded and unloaded by the carrier vehicle via the loading arm, the transport device comprising the rotating device which is configured such that the transport device is rotatable about the essentially vertical rotation axis (D) relative to the carrier vehicle, and
   further wherein a scope of rotation of the rotating device is at least 90°.

2. The transport device according to claim 1,
   wherein the rotating device comprises a rotary joint which is at least partially arranged on the support frame, and via which the milling unit can be rotated about the rotation axis (D) relative to the support frame.

3. The transport device according to claim 1,
   wherein the rotating device is a rotary plate, the rotation axis (D) of which extends essentially centrally with respect to a distance to longitudinal sides of the transport device.

4. The transport device according to claim 1,
   wherein the transport vehicle connector comprises a loading arm connection via which the transport device is connectable to a loading arm of a carrier vehicle, and that the rotating device comprises a rotary joint via which the loading arm connection can be rotated relative to the support frame of the transport device.

5. The transport device according to claim 1,
wherein the rotating device comprises a rotary sleeve having a hook eyelet which protrudes in a radial direction relative to the rotation axis (D).

6. The transport device according to claim 1,
wherein at least one guide rail is provided via which a displacement of the milling unit relative to the support frame is possible.

7. The transport device according to claim 6,
a rail extension is provided via which a track of the guide rail is extendable beyond the outer circumference of the support frame, the rail extension comprising at least one of the following features:
a) it is movable so as to be pivotable and/or displaceable on the support frame between a transport position and a displacement position;
b) it is configured to be mountable and dismountable on the support frame (14) via plug mounting, screw mounting and/or latch mounting; and
c) a drive device is provided with which adjustment of the guide rail between a transport position and a displacement position is driven via a motor.

8. The transport device according to claim 1,
wherein the transport device comprises a milling unit receptacle device which is supported on the support frame such that it is adjustable relative to said support frame.

9. The transport device according to claim 6,
wherein the milling unit receptacle device comprises a transport skid which is adjustable along the guide rail and the rail extension, which is configured to receive the milling unit and which is adjustable relative to the support frame.

10. The transport device according to claim 1,
wherein the support frame and the transport vehicle connector of the transport device together are formed in a manner of a dumper trough.

11. A method for transporting a milling unit via the transport vehicle according to claim 1, comprising the steps of:
a) loading the milling unit onto the transport device;
b) rotating the milling unit about the essentially vertical rotation axis (D) for alignment of the transport device relative to the carrier vehicle;
c) loading the transport device together with the milling unit onto the carrier vehicle;
and/or
d) delivering the milling unit with the transport vehicle;
e) unloading the transport device from the carrier vehicle;
f) rotating the milling unit about the essentially vertical rotation axis (D) for alignment of the milling unit relative to a road milling machine;
g) fastening the milling unit to the road milling machine.

12. The method according to claim 11,
wherein rotation of the milling unit is effected in steps b) and f) by rotating the milling unit on the transport device and/or by rotating the transport device.

13. The method according to claim 11,
wherein the method further comprises displacement of the milling unit on the transport device using a rail system.

14. The transport device according to claim 1,
wherein a scope of rotation of the rotating device is at least 180°.

15. The transport device according to claim 1,
wherein a scope of rotation of the rotating device is at least 360°.

* * * * *